United States Patent [19]

Terashita

[11] Patent Number: 5,017,014

[45] Date of Patent: May 21, 1991

[54] PHOTOGRAPHIC PRINTING EXPOSURE DETERMINING APPARATUS AND FILM TYPE DATA PROCESSING APPARATUS FOR PHOTOGRAPHIC PRINTER

[75] Inventor: Takaaki Terashita, Kanagawa, Japan

[73] Assignee: Fuji Photo Film Co., Ltd., Kanagawa, Japan

[21] Appl. No.: 398,681

[22] Filed: Aug. 25, 1989

[30] Foreign Application Priority Data

Sep. 29, 1988 [JP] Japan .................. 63-245810
Sep. 29, 1988 [JP] Japan .................. 63-245811

[51] Int. Cl.⁵ .................. G01J 3/40; G01N 21/25; G03B 27/72
[52] U.S. Cl. .................. 356/404; 356/406; 355/35
[58] Field of Search .......... 356/406, 404; 355/35, 355/33, 38, 77

[56] References Cited

U.S. PATENT DOCUMENTS

| | | | |
|---|---|---|---|
| 4,797,713 | 1/1989 | Terashita et al. | 355/38 |
| 4,884,102 | 10/1989 | Terashita | 355/35 |
| 4,905,039 | 2/1990 | Terashita | 355/35 |

FOREIGN PATENT DOCUMENTS

| | | | |
|---|---|---|---|
| 61-198144 | 2/1986 | Japan | 356/37 |
| 62-85235 | 4/1987 | Japan | 356/37 |

Primary Examiner—Vincent P. McGraw
Assistant Examiner—LaCharles P. Keesee
Attorney, Agent, or Firm—Sughrue, Mion, Zinn, Macpeak & Seas

[57] ABSTRACT

Codes (the so-called DX codes) recorded on a plurality of films are read to classify the films into a plurality of film types. Light is measured with respect to images on the films to obtain image densities, and, on the basis of the resultant photometric values, the image densities are obtained and are then stored in correspondence with the film types. A reference value is calculated on the basis of the image density that corresponds to the film type to which one of the films to be subjected to printing belongs. A color region is specified on the basis of the calculated reference value, and, on the basis of photometric values that belong to the specified color region, image density values for the three primary colors are calculated. The exposure for use in the printing of the film to be subjected to printing is determined from a reference printing exposure condition already stored and the calculated image density values for the three primary colors. The stored image densities are compared to one another to determine whether they are identical or similar, and certain film types corresponding image densities which have been determined to be identical or similar are integrated as the same film type.

19 Claims, 16 Drawing Sheets

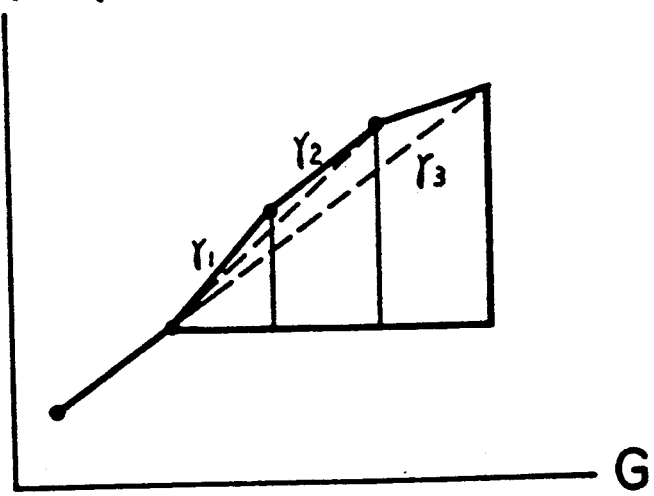

FIG. 11

|   |   |   |   |   |   | G'-B' |   |   |   |   |   |
|---|---|---|---|---|---|---|---|---|---|---|---|
| 4 | 4 | 4 | 4 | 4 | 4 | 4 | 4 | 4 | 4 | 2 | 2 |
| 4 | 4 | 4 | 4 | 4 | 4 | 4 | 4 | 3 | 3 | 2 | 2 |
| 4 | 4 | 4 | 4 | 4 | 1 | 1 | 1 | 3 | 3 | 3 | 2 |
| 4 | 4 | 4 | 4 | 1 | 1 | 1 | 1 | 3 | 3 | 3 | 2 |
| 5 | 4 | 4 | 1 | 1 | 1 | 1 | 1 | 3 | 3 | 3 | 2 |
| 5 | 5 | 4 | 1 | 1 | 1 | 0 | 0 | 1 | 3 | 3 | 2 | 2 |
| 5 | 5 | 5 | 1 | 1 | 0 | 0 | 0 | 0 | 1 | 1 | 2 | 2 |
| 5 | 5 | 5 | 1 | 1 | 0 | 0 | 0 | 0 | 1 | 1 | 2 | 2 |
| 5 | 5 | 5 | 1 | 1 | 1 | 0 | 0 | 1 | 1 | 7 | 7 |
| 5 | 5 | 5 | 5 | 1 | 1 | 1 | 1 | 1 | 7 | 7 |
| 5 | 5 | 5 | 6 | 6 | 1 | 1 | 1 | 1 | 7 | 7 |
| 5 | 5 | 6 | 6 | 6 | 6 | 6 | 6 | 6 | 7 | 7 |
| 5 | 6 | 6 | 6 | 6 | 6 | 6 | 6 | 6 | 7 | 7 |
| 6 | 6 | 6 | 6 | 6 | 6 | 6 | 6 | 6 | 6 | 7 | 7 |

R'-G' axis marker at right of row 8.

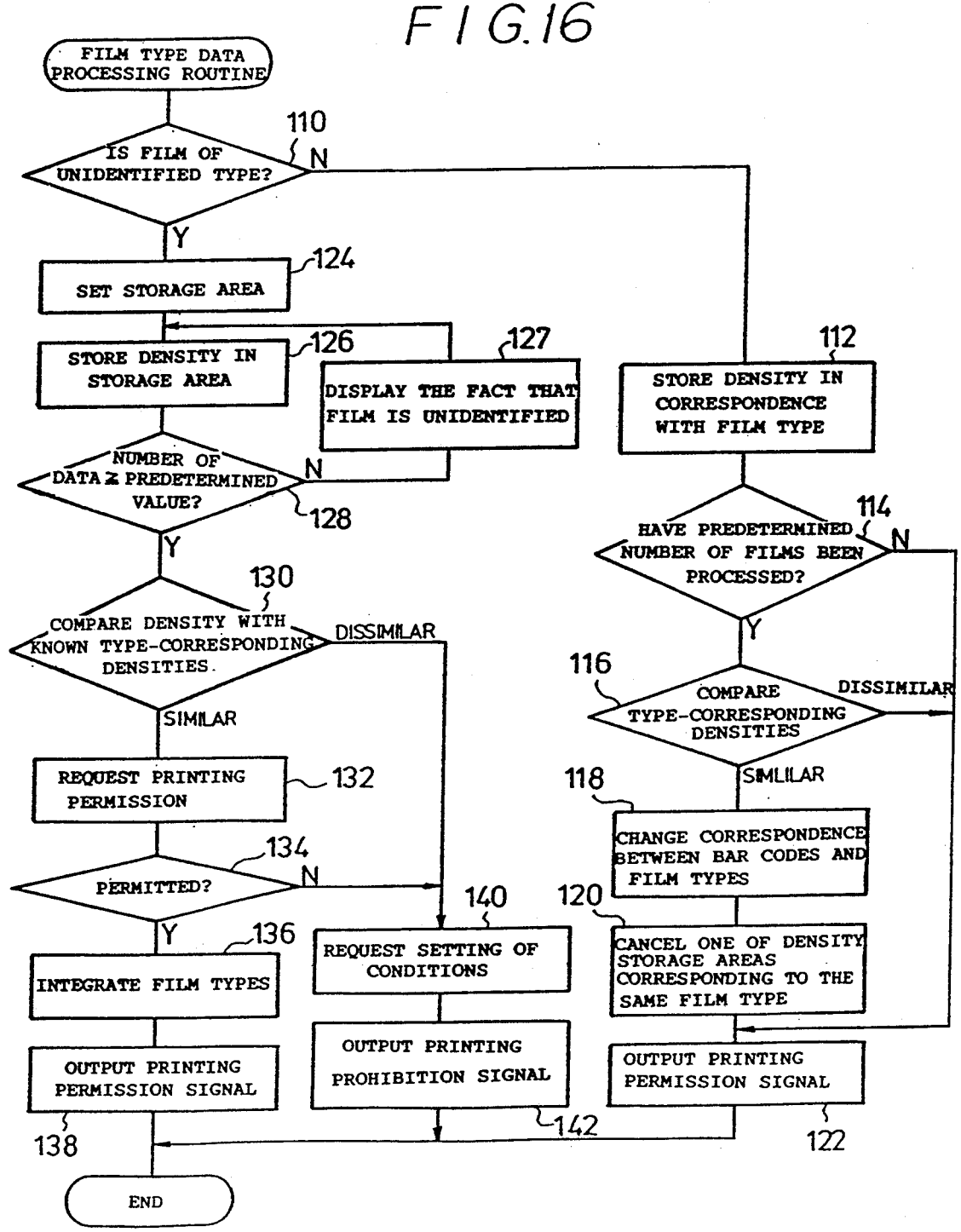

PHOTOGRAPHIC PRINTING EXPOSURE DETERMINING APPARATUS AND FILM TYPE DATA PROCESSING APPARATUS FOR PHOTOGRAPHIC PRINTER

BACKGROUND OF THE INVENTION

1. Field of the Invention

The present invention relates to a photographic exposure determining apparatus and a film type data processing apparatus for use in a photographic printer. In particular, the present invention relates to an apparatus for determining the exposure for photographic printing, that is capable of automatically determining, on the basis of a reference printing exposure condition, the correct exposure condition with respect to each of a plurality of film types; and also to an apparatus for processing data on film types that is used in a photographic printer and is capable of automatically determining the correct exposure condition in the above-described manner with respect to each of a plurality of film types, to process data on film types.

2. Description of the Related Art

An image formed on a color negative allows, on the whole, the transmission therethrough of light of three colors, i.e., blue (B), green (G), and red (R). It is known from experience that, as a rule, the transmittance values of these three color-components are substantially equal to one another, or in a fixed ratio to each other. From this fact, an automatic photographic printer determines a printing light quantity (i.e., exposure) on the basis of the following formula:

$$\text{Log } F_j = K_j + D_j \ldots \quad (1)$$

where log F represents the logarithm of the printing light quantity, K represents a constant, D represents the light accumulated transmission density (LATD) measured by a photometric system, and j stands for any of B, G, and R light.

However, when the printing light quantity is controlled by an automatic photographic printer on the basis of the above-stated formula (1), the following problem arises. A print produced from an underexposed negative has an overall high density, whereas a print produced from an overexposed negative has a low density. In order to cope with this problem, a slope control circuit is provided to correct the term $D_j$ in the formula (1) before the exposure is finally determined. However, even with an automatic printer provided with this slope control circuit, defective prints having incorrect color balance may be produced when the negative used is, for instance, a negative whose properties have changed due to the passage of a long period of time, a negative subjected to photographing using a light source much different from daylight, such as a fluorescent lamp or a tungsten lamp (i.e., a heterogeneous light-source negative), or a negative suffering from color failure. In addition, when it is necessary to process heterogeneous films, i.e., films manufactured by different manufactures, or films having differing sensitivities, because the three photosensitive layers of such heterogeneous films have different sensitivities, densities, etc., it is impossible to produce good prints under the same printing condition. Accordingly, the printing condition is determined with respect to each of the various different film types by trial and error before printing is affected. Thus, during the determination of the exposure, the term $D_j$ of the formula (1) is corrected (this procedure is called "color correction"). If heterogeneous films are to be processed, another procedure takes place where the slope control value is varied.

In recent years, many types of high-sensitivity films have been produced, and the number of film types available has increased to several tends of types. However, as described before, the printing exposure conditions required by a plurality of film types are not always the same. In addition, although condition setting films are used to set the condition of the automatic printer with respect to each of various different film types, they cover only a very limited number of film types, which may serve as reference film types. Normally, a condition setting film is a negative having a first portion corresponding to a negative on which an image of a gray object is formed by photographing, and a second portion disposed around the first portion and corresponding to a negative on which an image of a yellow-green object is formed by photographing. Three kinds of condition setting films, i.e., a correct exposure negative, an underexposed negative, and an overexposed negative are available with respect to one reference film type. However, with respect to those film types whose characteristics differ from those of reference film types, the printing exposure conditions have to be set based on experience. In this way, the setting of a printing exposure condition with respect to each of various different film types is very difficult and requires experience accumulated over a long period of time. Further, in order to maintain high print quality, it is essential to suitably manage the printing exposure conditions with respect to each of various different film types. However, this management is difficult when there are many film types. To cope with this problem, the following techniques have been proposed, in which the correct exposure to be used during printing with respect to each of various film types is automatically determined on the basis of a single reference condition for printing exposure.

Japanese Patent Laid-Open No. 62-85235 (1987) discloses a method in which a correction amount for correcting a printing exposure condition for a reference film is stored in a memory in correspondence with each of several film types. The film type of a film to be subjected to printing is determined by reading a bar code (the so-called DX code) recorded on the film. The correction amount corresponding to the determined film type is read to determine the exposure. With this method, however, since the correction amount has to be obtained before printing in correspondence with each of various film types, a great amount of labor is required and the level of precision achievable is insufficient when film types widely vary as they do nowadays. Furthermore, when a new film type is to be processed, a new correction amount has to be set. For this purpose, data on film codes have to be stored in the memory in correspondence with various film types. It is a very cumbersome task to manage a large number of film types, or to manage the addition of a new film type or the withdrawal of an obsolete film type.

Japanese Patent Laid-Open Nos. 51-94927 (1976), 52-20024 (1977), 59-220761 (1984), 61-198144 (1986), etc. disclose techniques to divide a film frame into a plurality of sections, measure light with respect to each of the sections, and to subsequently analyze items of data obtained by the measuring of light (i.e., the photometric values), and correct a reference printing exposure condition on the basis of a selected photometric value so as to determine the exposure condition for use in printing of a film image which is to be printed. According to this known art, if the spectral sensitivity distribution in the light-measuring portion of the photometric system of the automatic printer accords with that of a printing photosensitive material with a very high degree of precision, it is possible to subject a plurality of types of films having different characteristics, to printing on the basis of the printing exposure condition corresponding to a reference film type.

If such is the case, i.e., if the spectral sensitivity distribution of the photometric system accords with that of the exposure portion, it is possible to effect correct printing exposure with respect to each of several film types on the basis of the printing exposure condition for the reference film type, only when the following condition is simultaneously satisfied. That is, the linear portions of three curves representing the characteristics of the relevant film with respect to R, G and B lights are substantially parallel to the linear portions of three curves representing the characteristics of the reference film type. For this reason, the above-described known art fails to produce good printed images within the exposure region that corresponds to the non-linear portions of the characteristic curves. Furthermore, in order to select photometric data, a certain reference value (e.g., a neutral color value) is necessary. It is an essential requirement that this reference value is correct.

In order to obtain the correct reference value, a method is known in which the reference value is determined using photometric data on images of one whole film. However, when the majority of images in one film are images deviating from standard images, the resultant reference value will also deviate, thereby leading to an error in the selection of the photometric data. When there are only a small number of image frames on the film, and, accordingly, only a small number of items of photometric data is available, the resultant reference value will have a low level of accuracy.

In order to overcome the above-mentioned problems, it is necessary to classify a plurality of films of various different types according to their film types by reading the bar codes recorded on the films. Also, data on the image density of a relatively great number of film images is stored with respect to each of the film types, and the above-described reference value is calculated on the basis of the image density. However, this would lead to the problem that, as the number of film types increases, the number of items of data also increases, thereby resulting in a shortage of storage capacity.

SUMMARY OF THE INVENTION

The present invention has been made in order to overcome the above-described problems.

It is a first object of the present invention to provide an apparatus for automatically determining an accurate reference value on the basis of a plurality of image densities, and for determining an amount of photographic printing exposure to obtain good printed images.

It is a second object of the present invention to provide a film type data processing apparatus for use in a photographic printer that is capable of obtaining a correct reference value while requiring a small storage capacity.

In order to achieve the first object, according to a first aspect of the present invention, there is provided an apparatus for determining the photographic printing exposure comprising: a light measuring device for measuring light with respect to each of a plurality of film image portions into which images on films to be subjected to printing are divided, and for outputting photometric values obtained by measurement of the light; a reading device for reading codes which are recorded on the films and which are indicative of the film kinds of the films; a classifying device for classifying, the films into a plurality of film types to which the films belong on the basis of the read codes; a storing device for storing image densities calculated on the basis of the photometric values, each of the image densities corresponding to each of the film types; a density-value calculating device for calculating a reference value on the basis of the image density corresponding to one of the film types to which one of the films that is to be subjected to printing belongs, for determining a specific color region on the basis of the reference value, and for calculating, on the basis of photo-metric values belonging to the specific color region, image density values for three colors; and an exposure determining means for determining the exposure of the film to be subjected to printing on the basis of the image density values for three colors and a reference printing exposure condition already stored.

The exposure amount determining device may have an alternative arrangement in which the exposure for the film to be subjected to printing is determined on the basis of the reference printing exposure condition already stored, the image density values for three colors, and a correction value obtained by comparing the image density of a reference film type corresponding to the reference printing exposure condition with an average of the image densities of a plurality of images on films belonging to the film type to which the film to be subjected to printing belongs.

The apparatus may further comprise a setting apparatus for setting in the storing device a storage area in which, when a new code has been read from a film and the film on which the new code is recorded is found to be a new film type, the image density of the new film type is stored.

The operation of the apparatus in accordance with the first aspect of the present invention will be described. The light measuring device measures light with respect to each of a plurality of portions into which images on films to be subjected to printing are divided. By this measurement of light, photometric values for three colors are obtained with respect to each film image portion. The reading device reads codes which are recorded on the films and which are indicative of their film kinds. Since a film usually has a bar code recorded thereon which is indicative of its film kind by indicating, e.g., the title of the manufacturer of the film, the sensitivity of the film, and the name of the film as a product, the reading means may be arranged such that it reads such bar codes. The classifying means classifies the films on the basis of the read bar codes into film types to which the films belong. The storing means stores image densities obtained on the basis of the photometric values resulting from the measurement of light by the light measuring device, in such a manner that each of the image densities corresponds to one of the film types. Thus, a plurality of image densities each corresponding to one film type are stored in the storing device. The density-value calculating device calculates a reference value corresponding to the film type to which one of the films to be subjected to printing belongs, on the basis of the image density that corresponds to this film type, and that value is stored in the storing means. A value which may be used as the reference value is an average of a plurality of image densities, or a value obtained from this average and from a neutral color value or a flesh color value. The density-value calculating device also operates to specify a specific color region on the basis of the calculated reference value, and to calculate image densities for three colors of the basis of photometric values belonging to the specified color region. This specified color region may be a low-saturation region including neutral colors. Although the image density values for three colors may be calculated using only the photo-metric values belonging to the specific color region, as stated above, they may alternatively be calculated by converting photometric values belonging to regions which are not in the specified color region, into representative values obtained from the photometric values belonging to the specific color region, such as averages of the values for three colors.

The exposure determining means determines the exposure of the film to be subjected to printing on the basis of a reference printing exposure condition already stored and the calculated image density values for three colors.

With the above-stated alternative arrangement of the exposure determining means, it operates to determine the exposure of the film to be subjected to printing, on the basis of the reference printing exposure condition already stored, the image density values for the three colors, and a correction value obtained by comparing the image density of a reference film type corresponding to the reference printing exposure condition stored, with an average of the image densities of a plurality of images on films belonging to the film type to which the film to be subjected to printing belongs.

The apparatus may further operate in such a manner that, when a new code has been read from a film, the film on which the new code is recorded is recognized as a new film type, and a new storage area is set in which the image density of the new film type is stored. Thus, the apparatus is capable of coping with films of film types which have not previously been identified.

As described above, according to a first aspect of the present invention, since the apparatus is capable of automatically storing a plurality of image densities with respect to each of a plurality of different film types, then when the film type of a film to be subjected to printing is determined, it is possible to calculate the correct reference value on the basis of a plurality of image densities and, hence, to determine an appropriate exposure.

With respect to a new film type, the apparatus is capable of automatically setting a storage area in which the image density of the new film type is stored. Thus, the apparatus enables automatic determination of the correct reference value also with respect to a new film type, without requiring the inputting of further data, that is, without being informed of various specifications of the film type.

In order to achieve the second object, according to a second aspect of the present invention, there is provided an apparatus for processing data on film types which is for use in a photographic printer.

This apparatus has a light measuring device, a code reading device, a classifying device, a storing device, a determining device and a control device. The light measuring device is for measuring light with respect to the primary colors and with respect to film images on a plurality of films to be subjected to printing, and for outputting a plurality of sets of photometric values. The reading device is for reading codes which are recorded on the films and which are indicative of the film kinds of the films. The classifying device is for classifying the films into a plurality of film types to which the films belong on the basis of the read codes. The storing device has a plurality of different storage areas each corresponding to one of the film types and is capable of storing therein a plurality of items of data on the image density each corresponding to one of the film types and each concerning either the image densities with respect to the primary colors which are calculated on the basis of each of the plurality of sets of photometric values, or image-density combination values which are each obtained by combining the primary image densities. The determining device is for affecting comparison between the plurality of items of data each stored in the corresponding storage area of the storing means and each concerning the primary image densities or the image-density combination values. It is also for determining whether or not the compared plurality of items of data are identical or similar. The control device is for controlling the classifying means in such a manner that certain film types corresponding to the plurality of items of data that concern either the primary image densities or the image-density combination values and that have been determined to be identical or similar by the determining means, are classified into the same film type by the classifying means. It is also for cancelling one of the compared items of data on the image density which is stored in the corresponding storage area.

The apparatus may further comprise a setting device for setting in the storing device a storage area in which, when a new code has been read from a film and the film on which the new code is recorded is found to be a new film type, the image density of the new film type is stored.

The operation of the apparatus in accordance with the second aspect of the present invention will be described. The light measuring device measures light with respect to each of a plurality of portions into which images on films to be subjected to printing are divided. By this measurement of light, photometric values for the primary colors are obtained with respect to each film image portion. The reading means reads codes which are recorded on the films and which are indicative of their film kinds. Since a film usually has a bar code recorded thereon and indicative of its film kind by indicating, e.g., the title of the manufacturer of the film, the sensitivity of the film, and the name of the film as a product, the reading means may be arranged such that it reads such bar codes. The classifying means classifies the films on the basis of the read bar codes into a plurality of film types. The storing means stores either image densities obtained on the basis of the photometric values resulting from the measurement of light by the light measuring means, or combination values obtained by combining the image densities, in such a manner that each of the image densities corresponds to one of the film types. Thus, a plurality of image densities or a plurality of values of combination thereof, each corresponding to one film type, are stored in the storing device. The determining device compares either the plurality of image densities or the plurality of combination values which are stored in the corresponding storage areas of the storing device with one another, to determine whether the compared image densities or the combination values are identical or similar. If the compared image densities or the combination values have been determined to be identical or similar, the film types to which these items of data on the image density correspond are regarded as being of the same film type. Accordingly, the control device controls the classifying device in such a manner that the film types corresponding to the image densities, or the combination values that have been determined to be identical or similar, are classified by the classifying device as the same film type. The control device also operates to cancel one of the compared items of data on the image density stored in the corresponding storage areas. By this operation, image densities corresponding to the same film type are stored in one integrated storage area.

The apparatus may further operate in such a manner that, when a new code has been read from a film, the film on which the new code is recorded is found to be a new film type, and a new storage area is set in which the image density of the new film type is stored. Thus, the apparatus is capable of coping with films of film types which have not been identified.

As described above, according to the second aspect of the present invention, since the apparatus is capable of integrating the storage area in which data on the image density correspond to the same film type, it is possible to obtain a correct reference value without requiring any increase in the storage channel. Further, according to the present invention, since there is no need to determine the correspondence between the film types and codes on films, it is possible to carry out unmanned control over the setting of film codes, integration thereof, or withdrawal thereof. This in tern makes it possible to relieve operators from control work, prevent any error in operation, and appropriately distribute storage areas.

BRIEF DESCRIPTION OF THE DRAWINGS

FIG. 11 is a diagram showing color regions;

FIG. 16 is a flowchart showing the routine executed by a film type data processing means.

DESCRIPTION OF THE PREFERRED EMBODIMENTS

Figure 1:
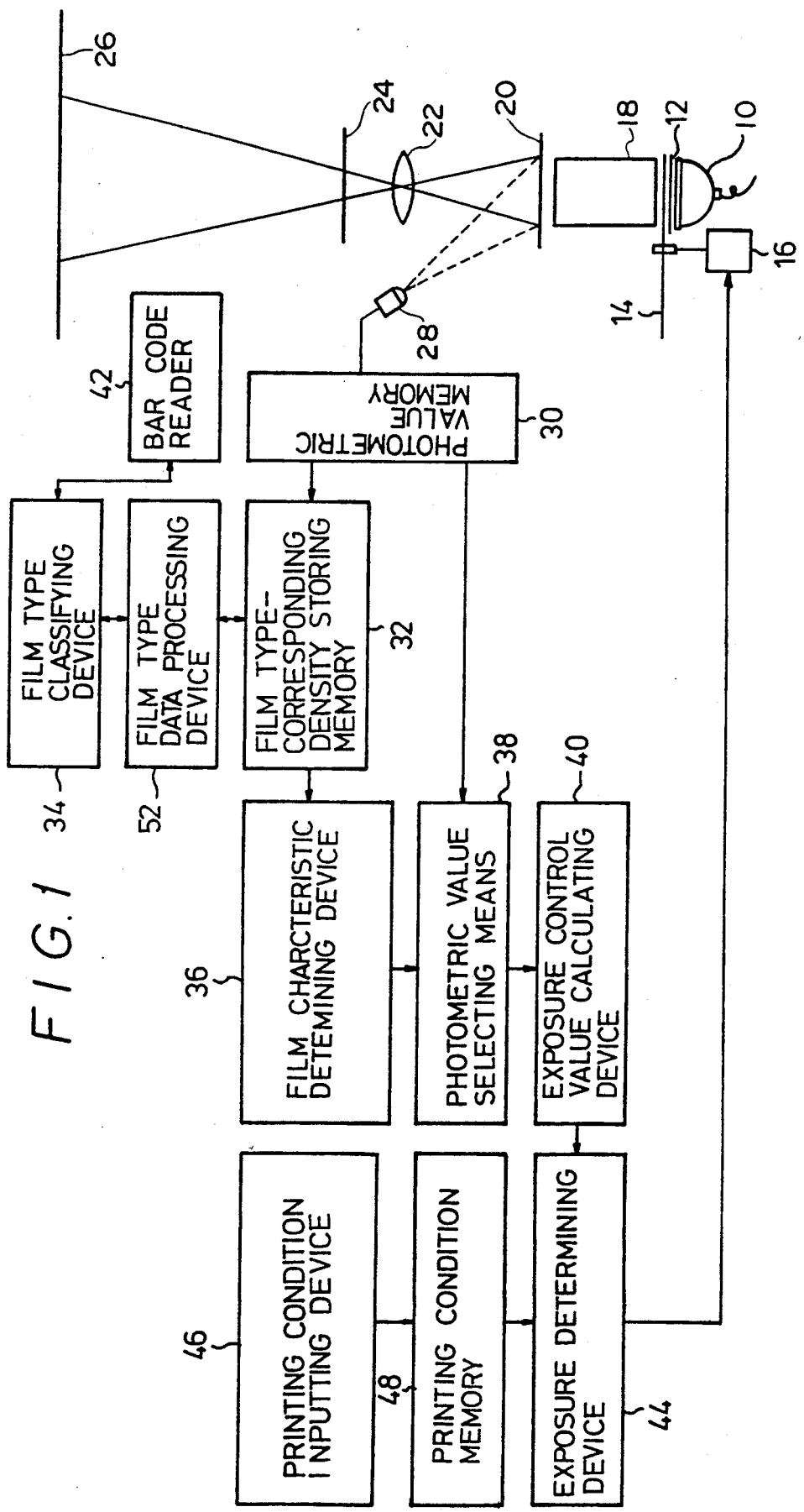
FIG. 1 is a schematic diagram showing an automatic color photographic printer employing an additive color process, to which the present invention may be applied.

Embodiments of the present invention will be described hereunder with reference to the drawings. In a first embodiment, the present invention is applied to an automatic color photographic printer employing an additive color process. As shown in FIG. 1, a negative film 20 is set in a negative carrier (not shown) and fed thereby to a printing portion of the printer. A mirror box 18 and a lamp house 10 provided with a halogen lamp are disposed in this order below the negative film 20, as viewed in the figure. A rotary disk 14 which can be rotated by a motor 16, and an infrared cutting filter 12 are inserted in this order between the mirror box 18 and the lamp house 10.

Figure 2:
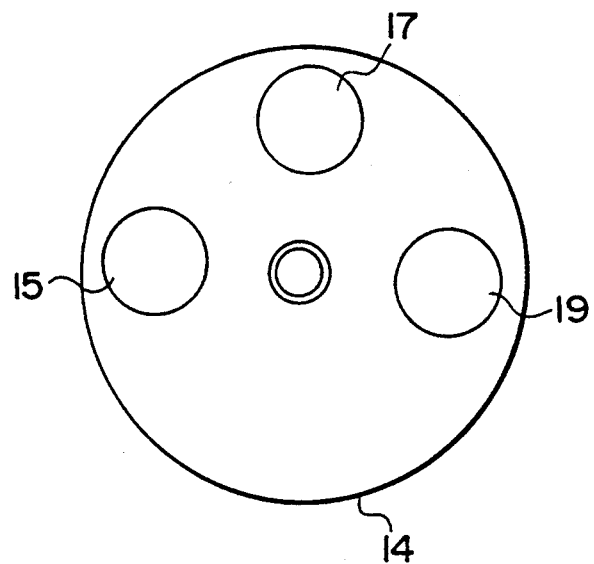
FIG. 2 is a plan view of a rotary disk with filters of the printer shown in FIG. 1.
Figure 3:
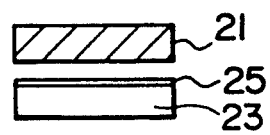
FIGS. 3 (1) and (2) are views of the filter shown in FIG. 2.
Figure 3:
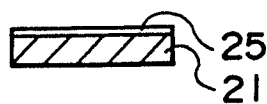
Figure 4:
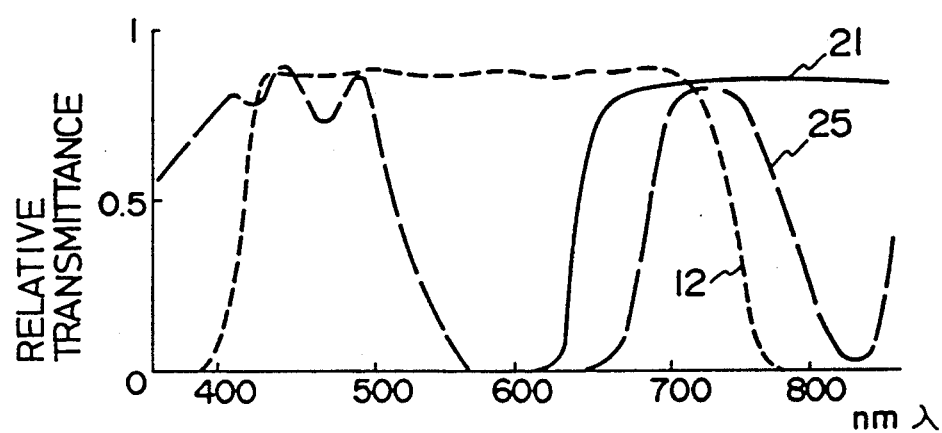
FIG. 4 is a graph showing the characteristics of the R filter.

As shown in FIG. 2, the rotary disk 14 has, on its peripheral portion, separation filters, namely, a G filter 15, a B filter 17, and an R filter 19. Each of the G filter 15, the B filter 17 and the R filter 19 has a structure in which, as shown in FIG. 3 (1), a white glass sheet 23 coated with a dielectric multi-layer film 25 and a colored glass sheet 21 of one of the colors R, G and B are disposed in parallel. FIG. 4 is a graph showing a state in which the colored glass filter 21 (e.g., R-64 filter, a product of Hoya Glass) and the dielectric multi-layer film 25 form R short wavelengths, while the thermally stable infrared cutting filter 12 is used to form R long wavelengths.

Each of the G filter 15, the B filter 17 and the R filter 19 may alternatively have the structure shown in FIG. 3 (2) in which a dielectric multi-layer film 25 is coated on the surface of a colored glass sheet 21. An arrangement may be adopted where the coating surface of the dielectric multi-layer film 25 may be adhered to a white glass sheet by bonding the layer 25 using a heat resistant epoxy-type adhesive.

Above the negative film 20, a lens 22, a black shutter 24, and color paper 26 are disposed in this order. The members described above form an image-forming optical system. Specifically, when light is projected from the lamp house 10, it passes through the infrared cutting filter 12, the filters on the rotary disk 14, the mirror box 18, and the negative film 20, and an image is formed by the lens 22 on a portion of the color paper 26.

A two-dimensional image sensor 28 is disposed at a position at which the sensor 28 obliquely faces the optical axis of the image-forming optical system and is capable of performing light measurement concerning the image density of the negative 20. The two-dimensional image sensor 28 has a storage-type photoelectric conversion device such as a CCD or MOS device, an optical system for forming an image of the negative film 20 on the photoelectric conversion device, and a signal processing circuit for processing an output of the photoelectric conversion device and for outputting the resultant output as image information. The photoelectric conversion device of the image sensor 28 measures light with respect to the primary colors R, G and B and with respect to each of a plurality of negative image sections into which images of the negative film 20 are divided. The signal processing circuit converts the output of the photoelectric conversion device into digital signals, converts the reciprocals of the signal values into corresponding logarithms, and then outputs density signals.

Figure 5:
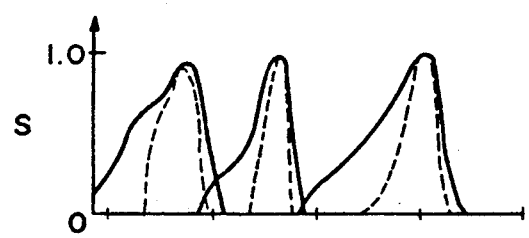
FIGS. 5 (1), (2) and (3) are graphs showing the spectral sensitivity distribution of color paper and a two-dimensional image sensor, and the characteristics of filters in an additive color process.
Figure 5:
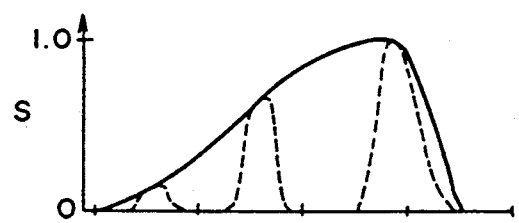
Figure 5:
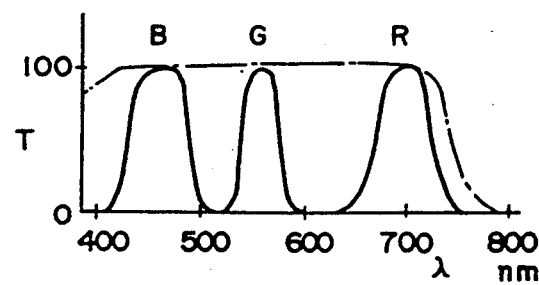

The infrared cutting filter 12 is able to exhibit a characteristic such as that indicated by the chain line in FIG. 5 (3), while the separation filters 15, 17 and 19 of the rotary disk 14 are able to exhibit relative spectral transmittance such as those indicated by the solid lines in FIG. 5 (3). The two-dimensional image sensor 28 is able to exhibit the relative spectral sensitivity distribution indicated by the solid line in FIG. 5 (2), and the sensor 28 is able to exhibit, in an additive color process, the spectral sensitivity distribution indicated by the broken lines in FIG. 5 (2). The relative spectral sensitivity distribution on the color paper 26 is indicated by the solid lines in FIG. 5 (1), while the spectral sensitivity distribution in an additive color process is indicated by the broken lines in FIG. 5 (1).

As shown in FIG. 1, the two-dimensional image sensor 28 is connected to a photometric value memory 30 for storing the values of density signals concerning R, G and B which have been output from the two-dimensional image sensor 28. The photometric value memory 30 is in turn connected to a film type-corresponding density storing memory 32 for storing image densities in correspondence with each of the film types, and also to a photometric value selecting means 38. A film type data processing device 52, a film type classifying device 34, and a bar code reading device 42 are connected in this order to the film type-corresponding density storing memory 32. The film type-corresponding density storing memory 32 is also connected via a film characteristic determining device 36 to the photometric value selecting device 38. The photometric value selecting device 38 is connected via an exposure control value calculating device 40 to an exposure determining device 44. A printing condition inputting device 46 is connected via a printing condition memory 48 to the exposure determining device 44. The exposure determining device 44 controls the exposure by controlling the motor 16 which in turn causes the rotation of the rotary disk 14.

The operation of this embodiment will now be described, with explanations being given concerning each of the blocks shown in FIG. 1.

The bar code reader 42 reads bar codes (the so-called DX codes) which are recorded on a plurality of films. On the basis of the read bar codes, the film type classifying means 34 determines the film sensitivity, the film families and the manufacturers of the films, and classifies the films in such a manner that those negative films or films of various kinds which have common factors concerning manufacturers, sensitivities, and some photographic characteristics such as the gradation, the base densities, the light sensitivity and the configuration of the characteristic curves, are classified as the same film type. Since a DX code indicates, in the form of a bar code, information indicative of the kind of a film, such as the title of the manufacturer of the film, the film sensitivity, and the film family, then when a bar code reader is used to read a bar code, the kind of the film can be detected. On the basis of this detection, it is possible to classify films to be subjected to printing into a plurality of film types. Each film type may include a kind or kinds of films which are classified into the same film type mainly because they can be subjected to printing under the same or substantially the same printing exposure condition. Films of one kind often fall under the same film type. Therefore, in the present invention, the "film type" and the "film kind" are not strictly distinguished because such is not deemed necessary.

The film type-corresponding density storing memory 32 operates to accumulate and store values output from the photometric value memory 30 with respect to each of the film types into which the films have been classified by the film type classifying device 34. In this operation, the teachings disclosed in, for instance, Japanese Patent Laid-Open No. 61-267749 (1986) may be used. That is, the selected photometric value or the photometric value for each light measurement point, or the density at each portion of the image, or the density of the entire image is obtained with respect to each of R, G and B. Subsequently, as shown in the following table, the image densities obtained with respect to the primary colors are stored into storage areas a, b, c, etc., in correspondence with the film types A, B, C, etc. Instead of the image densities with respect to the primary colors, combination values each obtained from a certain combination of these image densities, such as the difference between, or the ratio of, the densities with respect to two colors may be used.

| FILM TYPE | STORAGE AREA |
|---|---|
| A | a |
| B | b |
| C | c |

To additionally describe the above-described members of the printer, the bar code reader 42 reads a bar code recorded on a lateral edge portion of a color negative, set as the negative film 20 in the negative carrier. Data on the bar codes read by the bar code reader 42 is input to the film type classifying device 34. The film type classifying device 34 is provided with a memory in which bar codes and film types are stored in mutual correspondence. The film type classifying device 34 determines to which of the film types the bar code read from a film by the bar code reader 42 belongs, so as to classify the film into the film type to which its bar code belongs. The information on the film types into which the films have been classified by the film type classifying device 34 is input to the film type data processing device 52.

Referring to FIG. 16, a film type data processing routine performed mainly by the film type data processing device 52 will be described. In Step 110, it is determined whether the classified film belongs to an unidentified type or an already identified type. If the film is determined to belong to an already identified type, Step 112 is executed whereby particular photometric values concerning the film and stored in the photometric value memory 30 are converted into the corresponding image density and then stored in the corresponding area of the film type-corresponding density storing memory 32. The film type-corresponding density storing memory 32 has areas provided therein in correspondence with the film types so that image densities can be stored in correspondence with the film types. Examples of densities which may be used as the image density include an average image density, and a density selected from among various image densities such as an average of the densities of high-density portions of images, an average of the densities of intermediate-density portions of images, an average of the densities of low-density portions of images, or the lowest density of images.

In the next step 114, it is determined whether a predetermined number of films have been processed. If it is determined that a predetermined number of films have been processed, Step 116 is executed whereby a comparison is made between one image density Dj (j representing one of the colors R, G and B) which corresponds to one film type and is stored in the corresponding storage area of the film type-corresponding density storing memory 32, and another image density Dj'' which is stored, as an image density corresponding to another film type, in another storage area of the memory 32, so as to determine if the film types to which these image densities correspond are identical or similar. Specifically, data on the image density stored in two storage areas, i.e., either the image densities Dj and Dj'' stored in two areas, or the differences between or the ratios of density values stored in two areas wherein each is obtained by combining image densities with respect to two or more colors, are compared to determine whether they are identical or similar. In this way, a determination is made of whether the film types to which these data on image density correspond are the same or similar, or dissimilar. For instance, if combination values each obtained by combining image densities with respect to two or more colors are used, combination values stored in two areas may be compared with each other by making the following determination: the determination as to whether or not the difference in image density between $|(DR-DG)-(DR'-DG')|$, $|(DG-DB)-(DG'-DB')|$, or the like is below a predetermined value; or the determination as to whether or not the ratios of image densities, these ratios being DR/DW, DG/DW, DB/DW, etc. (DW=DR+DG+DB), are similar. An arrangement may be adopted wherein, at the time of storing an image density from the photometric value memory 30 to the film type-corresponding density storing memory 32, part of or the entire image density is calculated as the above-described combination value obtained by combining image densities with respect to two or more colors.

After comparisons have been affected between the image densities Dj and Dj' or the combination values stored in any of a plurality of pairs of storage areas, if they are determined as not being identical with or similar to each other, Step 122 is executed whereby a printing permission signal is output. On the other hand, if, as a result of the comparison, there are any image densities or combination values thereof which are stored in two different areas but are determined to be identical or similar, it is determined that the films corresponding to those identical or similar values belong to the same type. Accordingly, in Step 118, the data on the correspondence between the film types and the bar codes which the film type classifying device 34 stores in its memory is changed in such a manner that certain film types corresponding to the same or similar image densities or combination values thereof will become the same film type. As a result, when, in Step 116, a plurality of film types are determined to correspond to the same or similar image densities or combination values thereof, the films belonging to these film types are made to belong to only one of the plurality of film types. In the following step 120, these plurality of film types are integrated so that only those data stored in the area corresponding to the film type resulting from the integration is used, while the data concerning the unnecessary image density that is stored in the area or areas corresponding to the unnecessary film type or film types are cancelled. Then, Step 122 is executed. The integration of, e.g., two film types, may be performed by cancelling data in the area corresponding to one of the film types and rendering data in the area corresponding to the other usable, as described above, or alternatively, by cancelling data in one of the areas by merging at least part of this data with the data in the other area.

On the other hand, if the film type classifying device 34 determines in Step 110 that one of the films to be subjected to printing is of an unidentified type, Step 124 is executed whereby an address for this unidentified film type is set within the film type-corresponding density storing memory 32, and a storage area for storing the image density corresponding to the unidentified film type is set in the memory 32. Subsequently, in Step 126, the photometric values concerning the film and stored in the photometric value memory 30 are converted into the corresponding image density and then stored in the storage area set in Step 126. In the following step 128, it is determined whether the number of items of data stored in the memory. 32 is equal to or greater than a predetermined value (e.g., 1000). If this number is above the predetermined value, Step 130 is executed whereby the image density of this unidentified film type is compared with the image density corresponding to a known film type in the manner described above in relation to Step 116. On the other hand, if the number of data stored in film type-corresponding density storing memory 32 is determined to be below the predetermined value in Step 128, the fact that the film type is unidentified is displayed in Step 127. By virtue of the provision of this step, the operator is able to cause the feeding of the pertinent negative film so that light measurement is affected with respect to images on the film and the resultant image density is stored in the film type-corresponding density storing memory 32. Thus, the operator can increase the number of data before he proceeds to printing.

After comparing the image density of the unidentified film type and any of the plurality of film type-corresponding image densities stored in the film type-corresponding density storing memory 32, if the former image density is found to be not identical or similar to any of the latter image densities, Step 140 is executed. In Step 140, a request in the form of a display or a warning is made whereby the operator is requested to set necessary conditions. This is followed by the execution of Step 142 in which a printing prohibition signal is output. By this action, a printing exposure operation is prohibited until the necessary conditions are set. Even in this case, however, conditions should preferably be set based on a printing exposure condition for a reference film type so that printing may be affected without any conditions being set anew.

On the other hand, if it is determined in Step 130 that the image density of the unidentified film type is identical or similar to one of the image densities corresponding to the known film types, Step 132 is executed whereby an inquiry is made as to whether the film of this particular film type should be printed under the condition for the known film type, the image densities of these film types having been determined to be identical or similar. When this inquiry is made, the operator manually turns on a printing permission switch or a printing prohibition switch of the printer. In Step 134, it is determined whether the printing permission switch has been turned on. If it is found out that the printing prohibition switch has been actuated, Step 140 is executed in which the setting of necessary conditions is requested. On the other hand, if it is determined that the printing permission switch has been actuated, Step 136 is executed whereby the relationship between the film types and the bar codes which is stored in the film type classifying means 34 is changed. This is changed in such a manner that the film of the particular film type is made to belong to the known film type corresponding to the image density that has been determined to be identical with or similar to that of the film of the particular type. This operation is followed by the execution of Step 138 in which a printing permission signal is output. In the case being discussed, the stored data on the image density corresponding the particular film type may either be merged with the data stored in the area corresponding to the known film type and then be cancelled, or be allowed to remain stored. If the data on the image density corresponding to the particular film type is allowed to remain stored in this way, the data will be merged with the data on the image density corresponding to the same or similar film type in the next execution of Step 114 to Step 120. The above-described display or the like which is made to request the operator to set necessary conditions or to inquire of the operator about the printing permission, is necessary also when there are films of certain types which cannot be printed under the same condition as the printing condition for a reference film type. Thus, the present invention may be applied to such cases as well.

With respect to films of certain film types which are no longer manufactured or which only need to be printed on very rare occasions due, for instance, to geographical differences in sales areas, the storage areas for storing data on these film types should preferably be merged with those corresponding to the most similar film types. Alternatively, such storage areas may be cancelled, and the operator may be informed of the fact that such films have been found, via a display, a warning, or the like. Whether or not the above-described mergence or cancellation should be affected must be determined on the basis of the number or proportion of such films or image frames relative to the total number of films or image frames to be subjected to printing. For this purpose, the film type-corresponding density storing memory 32 should preferably be provided with a memory area for enabling the number of films or image frames to be counted. The provision of this function also helps to curb successive increase in the number of storage areas.

Figure 6:
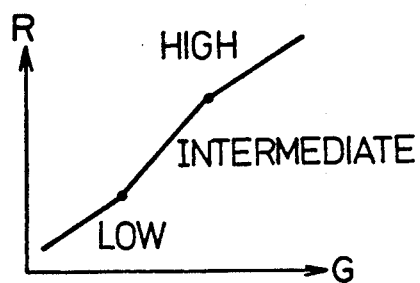
FIGS. 6 (1) and (2) are graphs showing examples of characteristic curves.
Figure 6:
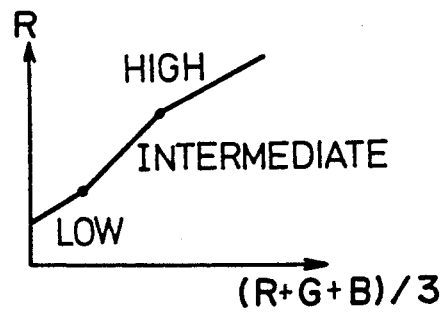

The film characteristic determining means 36 determines the characteristics of the films on the basis of the densities with respect to R, G, and B which are stored in the film type-corresponding density (image density) storing memory 32. Descriptions will be given below concerning an example in which the gradient (i.e., the $\gamma$ value) of the film characteristic curve is used as the characteristic of a film. In this embodiment, the film type-corresponding density storing memory 32 stores image density values with respect to R, G, and B in correspondence with each of the film types. First, a reference value for one of the films to be subjected to printing is calculated on the basis of the stored image density values with respect to R, G and B. This reference value is, for example, the density value with respect to R (hereinafter referred to as "density value R"), or an average $(R+G+B)/3$ of the density values with respect to R, G and B. The ratio of each of the stored density values R, G and B to the thus calculated reference value is calculated, thereby obtaining a characteristic of the film with respect to each of R, G and B. FIG. 6 (1) shows the characteristic curve representing the relationship of the density value G with the density value R. FIG. 6 (2) shows the characteristic curve representing the relationship of the density value R with respect to the average density $(R+G+B)/3$.

Figure 7:
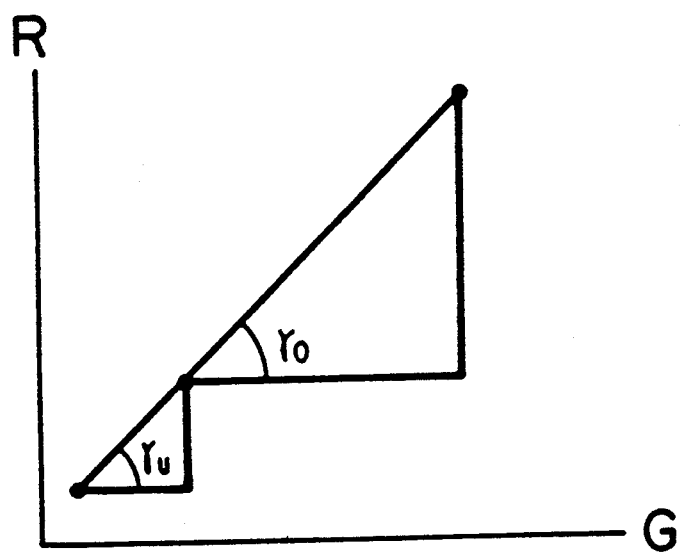
FIGS. 7 (1), (2) and (3) are graphs used to explain film characteristics.
Figure 7:
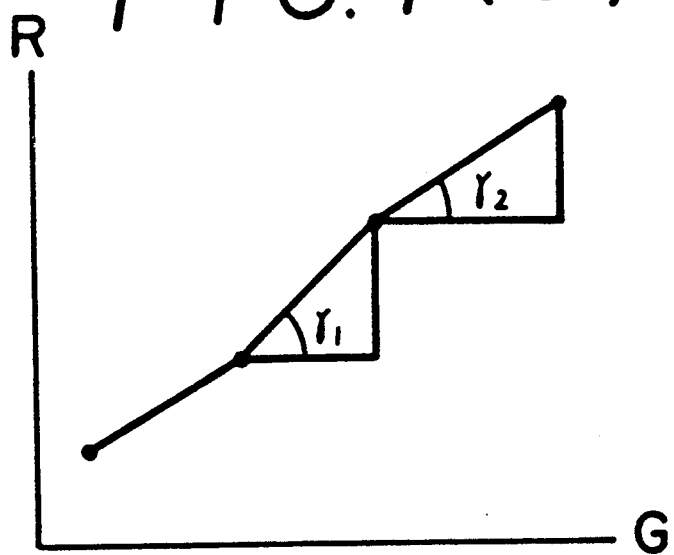

The characteristic of that particular film may be determined, for instance, in the following manner. As shown in FIG. 7 (1), a gradient $\gamma_U$ in the underexposed portion and a gradient $\gamma_O$ in the underexposed portion may be used. Alternatively, the average of gradients $(\gamma_1+\gamma_2\gamma_3)/3$ shown in FIG. 7 (2), or the gradient $\gamma_1$ or $\gamma_2$ shown in FIG. 7 (3) may be used. Although in the above-described example, the characteristics of the relevant film is automatically determined using the film type-corresponding density storing memory 32 and the film characteristic determining device 36, these means may be omitted. In this case, data on film characteristics are stored into a memory (a film characteristic memory device) so that the necessary item of data is read from the memory by the film type classifying device 34 and then input to the photometric value selecting device 38.

Figure 8:
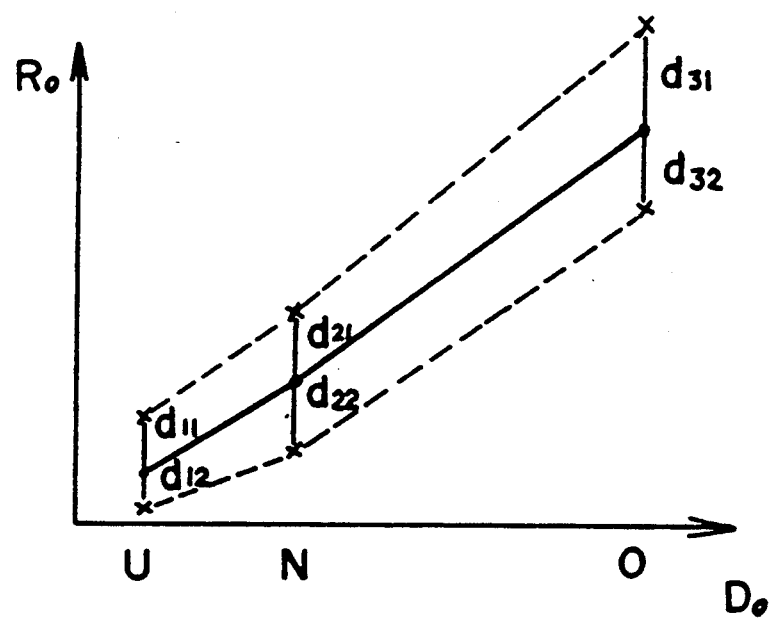
FIG. 8 is a graph showing a specific region from which photometric values are selected.
Figure 9:
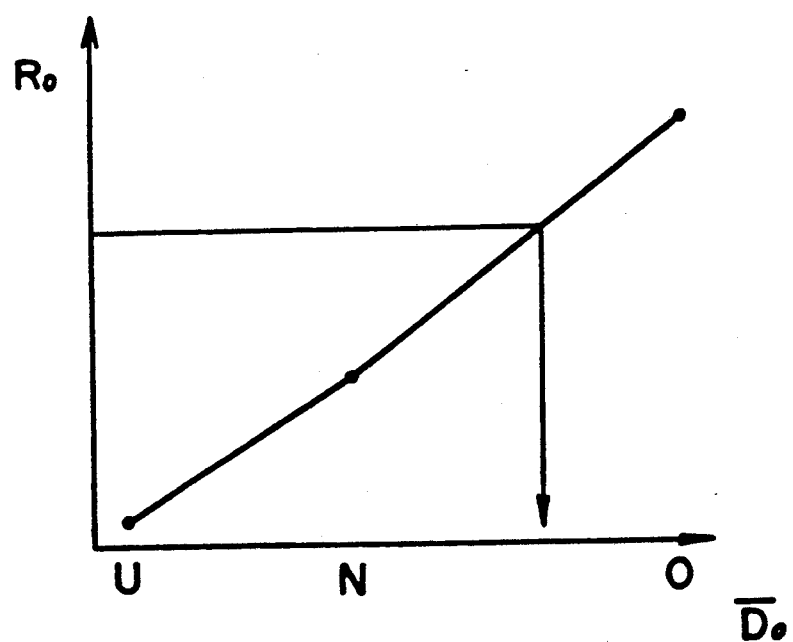
FIG. 9 is a graph showing a curve for converting the photometric values.

The photometric value selecting device 38 selects, in accordance with the thus determined film characteristic, photometric values which are used to calculate density values for exposure control. Specifically, the selecting device 38 selects, in accordance with the film characteristic determined by the film characteristic determining device 36, those photometric values from among the data stored in the photometric value memory 30 which belong to a specific color region. This color region is that set on a color coordinate system whose coordinates represent the difference $(R'-G')$ between the density values R and G and the difference $(G'-B')$ between the density values R and G, R', G' and B' values described later. The specific color region is, for instance, a color region including a neutral color (e.g., gray) density value and a flesh color density value. Descriptions given below concern an example of the manner in which photometric values that belong to a specific color region are obtained. First, the density values $R_O$, $G_O$ and $B_O$ of a standard negative film with respect to three colors, as well as the average $D_O=(R_O+G_O=B_O)/3$ of these density values are used to obtain a curve, such as that shown in FIG. 8, with respect to each of the standard density values $R_O$, $G_O$ and $B_O$ (FIG. 8 showing the case of $R_O$). Furthermore, in order to allow data within ranges close to the specified color region to be included, offset amounts $d_{11}$ and $d_{12}$, $d_{21}$ and $d_{22}$, or $d_{31}$ and $d_{32}$ are set with respect to each of underexposure, normal exposure, and overexposure portions, thereby setting the region indicated by broken lines in FIG. 8. Subsequently, the average $D=(R+G+B)/3$ of the photometric values R, G and B concerning the film is calculated, and a determination is made as to whether the photometric value R corresponding to the average value D is included within the region indicated by the broken lines in FIG. 8. A similar determination is also made with respect to each of the photometric values G and B, as to whether they are included within the respective regions, each being such as that indicated by the broken lines in FIG. 8. The photometric values R, G and B are selected and used in the calculation of density values for exposure control only if all these photometric values R, G and B are included in the regions, such as that shown in FIG. 8, which are set with respect to density values $R_O$, $G_O$ and $B_O$ of a standard negative film. If any of the photometric values R, G and B is not included in the region, the photometric value is not used to calculate density values for exposure control; alternatively, the value is converted into, for instance, an average of the photometric values R, G and B, or the average of those photometric values belonging to the regions, such as that shown in FIG. 8, so that all these values are used in the calculation of exposure controlling density values. The above-described offset amounts $d_{11}$ to $d_{32}$ should preferably be changed in accordance with the type of film or with the gradients $R_O/D_O$, $G_O/D_O$, and $B_O/D_O$.

The above-described photometric values may alternatively be selected in the following manner. A characteristic curve such as that described above with reference to FIG. 8 is determined with respect to each of the density values $R_O$, $G_O$ and $B_O$, as shown in FIG. 8. Each of these characteristic curves is used to convert each of the photometric values R, G and B into an average $D_O$ by the method disclosed in Japanese Patent Laid-Open No. 60-27352 (1985), thereby obtaining density values R', G' and B'. By this conversion, certain photometric values assuring the same color balance as that of a standard negative film are converted into equivalent density values R', G' and B'. Subsequently, a determination is made, on the chromaticity diagram, as to whether these density values R', G' and B' should be used to calculate density values for exposure control. The selection of the photometric values to be used for this purpose may be performed by affecting the weighting of the photometric values, as disclosed in Japanese Patent Laid-Open Nos. 61-198144 (1986) and 61-223731 (1986).

Figure 10:
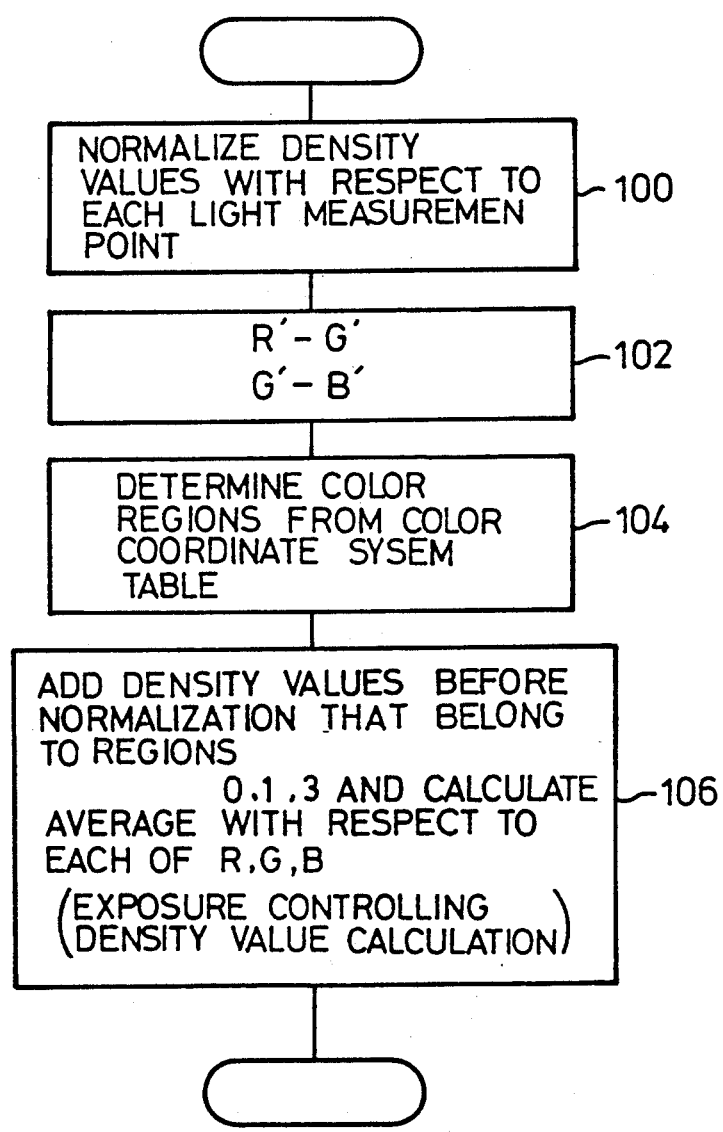
FIG. 10 is a flowchart for calculating density values for exposure control.

The exposure control value calculating device 40 calculates density values for exposure control, using the photometric values selected by the photometric value selecting device 38. Specifically, the calculating device 40 sorts the photometric values, and, on the basis of density values obtained from the result of the sorting, calculates exposure controlling density values, by the method disclosed in Japanese Patent Laid-Open Nos. 61-198144 (1986), 61-223731 (1986), and 61-232442 (1986). Referring to FIG. 10, Steps 100 to 104 are executed by the photometric value selecting device 38. In step 100, the selecting device 38 operates to normalize the density values with respect to each of the plurality of light-measurement points, using as the origins those points corresponding to the specified color region. In the following step 102, the normalized density values R', G' and B' are used to calculate the differences R'−G' and G'−B'. In Step 104, the selecting device 38 determines color regions, such as those shown in FIG. 11, from a color coordinate system table, the regions each corresponding to each of the measurement points. Thereafter, the selecting device 38 selects measurement points which belong to a closed region on a color coordinate system that includes a neutral color, or a flesh color, or both a neutral color and a flesh color. For instance, the measurement points belonging to the regions 0 (neutral color) shown in FIG. 11, or the regions 1 and 3 (flesh color) are selected. Subsequently, the exposure control value calculating device 40 operates to obtain the total of the density values at the selected measurement points before the normalization, and calculate an average with respect to each of R, G and B, so that these averages may be used as exposure controlling density values. Because the exposure control density values are obtained from density values none of which is a density value that may result in color failure, the thus obtained density values can be used to determine the exposure without causing any reduction in the level of color correction.

The printing condition inputting device 46 and the printing condition memory 48 allow the inputting and storing of printing conditions (printing exposure conditions) with respect to R, G and B which may be used during printing using a reference film type, e.g., Super HR100 (a name of a product manufactured by Fuji Film). These printing conditions concern at least one of the exposure, the exposure time, the filter amount, the light source luminance, the light source voltage, and the slope control value. The printing conditions are set using condition setting films.

The exposure determining device 44 determines the exposure to be used during printing of one of the films to be printed, using the printing conditions for a reference film type which are stored in the printing condition memory 48, and the exposure controlling density values calculated by the exposure control value calculating device 40. The exposure determining device 44 determines the exposure in accordance with the formulas (9) given below.

Various formulas used to obtain the exposure determining formulas (9) will be described. When reference film type normal densities (corresponding to the printing exposure conditions for the reference film type) with respect to three colors R, G and B are represented by RN, Gn and BN, respectively, and the exposure controlling density values with respect to three colors R, G and B and for the film to be subjected to printing are represented by DR, DG and DB, respectively, exposure amounts er, eg and eb with respect to three colors R, G and B are expressed as follows:

$$\begin{pmatrix} \text{Log } er \\ \text{Log } eg \\ \text{Log } eb \end{pmatrix} = \begin{pmatrix} X11 & X12 & X13 \\ X21 & X22 & X23 \\ X31 & X32 & X33 \end{pmatrix} \begin{pmatrix} dR \\ dG \\ dB \end{pmatrix} \quad (3)$$

where $dR = DR - RN$, $dG = DG - GN$, $dB = DB - BN$, and X11 to X33 are coefficients expressed by the following formulas:

$$\left.\begin{aligned} X11 &= SC\,(1.0 + 2.0\,A_R)/3 \\ X12 &= X13 = SC\,(1.0 - A_R)/3 \\ X21 &= X23 = SM\,(1.0 - A_G)/3 \\ X22 &= SM\,(1.0 + 2.0\,A_G)/3 \\ X31 &= X32 = SY\,(1.0 - A_B)/3 \\ X33 &= SY\,(1.0 + 2.0\,A_B)/3 \end{aligned}\right\} \quad (4)$$

where SC, SM and Sy represents slope control values for R, G and B, respectively, which are expressed by SC=SCO, SM=SMO, SY=SYO ("O" in these equations expressing overslope) when $dR > O$, $dG > O$ and $dB > O$, and by SC=SCU, SM=SMU, SY=SYU ("U"

in these equations expressing overslope) when $dR<O$, $dG<O$ and $dB<O$; $A_R$, $A_G$, and $A_B$ (expressed generally as $Aj$) are color correction values for affecting color correction with respect to R, G and B.

Subsequently, when the above-stated formulas (3) are developed, with X11 to X33 being substituted using the formulas (4), and are rewritten using the relationship $(dR+dG+dB)/3=dW$, the following formulas (5) are obtained:

$$\begin{aligned} \text{Log } er &= SC\{A_R(dR-dW)+dW\} \\ \text{Log } eg &= SM\{A_G(dG-dW)+dW\} \\ \text{Log } eb &= SY\{A_B(dB-dW)+dW\} \end{aligned} \quad (5)$$

When $Aj=1.0$, this leads to a normal correction; when $Aj>1.0$, a high correction; and when $Aj<1.0$, a lowered correction. In this embodiment, the color correction values ($A_R$, $A_G$, and $A_B$) are determined in the following manner:

$$\begin{aligned} A_R &= K11(DR-RN)/(RO-RN)+K21 \\ A_G &= K12(DG-GN)/(GO-RN)+K22 \\ A_B &= K13(DB-BN)/(BO-RN)+K23 \end{aligned} \quad (6)$$

where $0 \leq K11, K12, K13 < 1.0$, and $0.5 < K21, K22, K23 < 2.0$; $A_R = K21$ when $DR < RN$, $A_G = K22$ when $DG < GN$, and $A_B = K23$ when $DB < BN$; and RO, GO and BO represent over density values used in the setting Of conditions for the reference film.

According to the formulas (6), the color correction values Aj become larger as the density grows from intermediate to high, so that the color correction values greatly influence the high-density non-linear exposure region to correct the printing exposure conditions for the reference film type.

Figure 15:
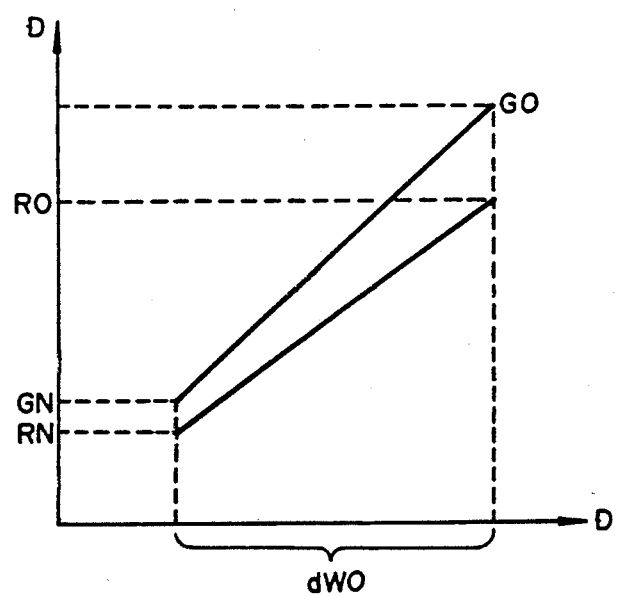
FIG. 15 is a graph used to explain the gamma balance value.

Furthermore, in this embodiment, gamma balance correction values Pj are used to achieve a color balance level equivalent to that obtainable with a standard film of the reference film type. It suffices if values corresponding to the reciprocal of the $\gamma$ value of the reference film type are used as the correction values Pj. When dWO is an average of the over density values RO, GO and BO with respect to the three colors R, G and B and relative to the respective normal density values RN, GN and BN serving as the reference, as shown in FIG. 15, and the average dWO is expressed as $$dWO=\{(RO-RN)+(GO-GN)+(BO-BN)\}/3. \quad (7),$$

the gamma balance correction values Pj ($P_R$, $P_G$, $P_B$) are expressed as follows:

$$\begin{aligned} P_R &= dWO/(RO-RN) \\ P_G &= dWO/(GO-GN) \\ P_B &= dWO/(BO-GN) \end{aligned} \quad (8)$$

When these correction values Pj are used, the exposure amounts er, eg and eb are expressed by the following formulas (9):

$$\begin{aligned} \text{Log } er &= SC\{A_R \cdot P_R \cdot (dR-dW)+dW\} \\ \text{Log } eg &= SM\{A_G \cdot P_G \cdot (dG-dW)+dW\} \\ \text{Log } eb &= SY\{A_B \cdot P_B \cdot (dB-dW)+dW\} \end{aligned} \quad (9)$$

With the exposure amounts er, eg and eb being expressed as the formulas (9), it is possible to determine exposure control vales Er, Eg and Eb when various parameters such as the inherent parameters of the automatic printer used and parameters of a duplication photo-sensitive material are set.

If RO, GO and BO in the relevant formulas are substituted by RU, GU and BU, respectively, the resultant formulas can be used with respect to the low-density regions.

When the exposure determining device 44 has calculated the exposure control values Er, Eg and Eb in this way, it controls the motor 16 on the basis of these control values so as to control the printing exposure.

Figure 14:
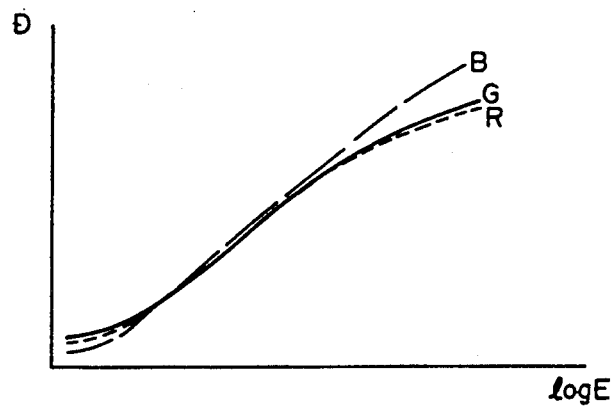
FIG. 14 is a graph showing the characteristic curves of paper of which the characteristic with respect to B light deviates to the high-density side.

As a result, the difference of the color balance between three colors of the film to be subjected to printing, from that of the reference film type is corrected. For instance, when, as shown in FIG. 14, the characteristic curve of the film with respect to one of the three colors deviates to the high-density side as compared with the characteristic curves of the same with respect to the other two colors, (i.e., when the tone with respect to the particular color relatively deviates to the high-contrast side), the above-described correction enables the exposure amount with respect to this color to be made greater than those with respect to the other colors, so as to achieve color balance matching with that of the reference film type. Conversely, when the characteristic curve of the film with respect to one of the three colors is lower than those with respect to the other two colors (i.e., when the tone with respect to the particular color relatively deviates to the high-contrast side), a correction is made in such a manner that the exposure amount with respect to this color is reduced below those with respect to the other colors, so as to achieve good color balance.

Figure 12:
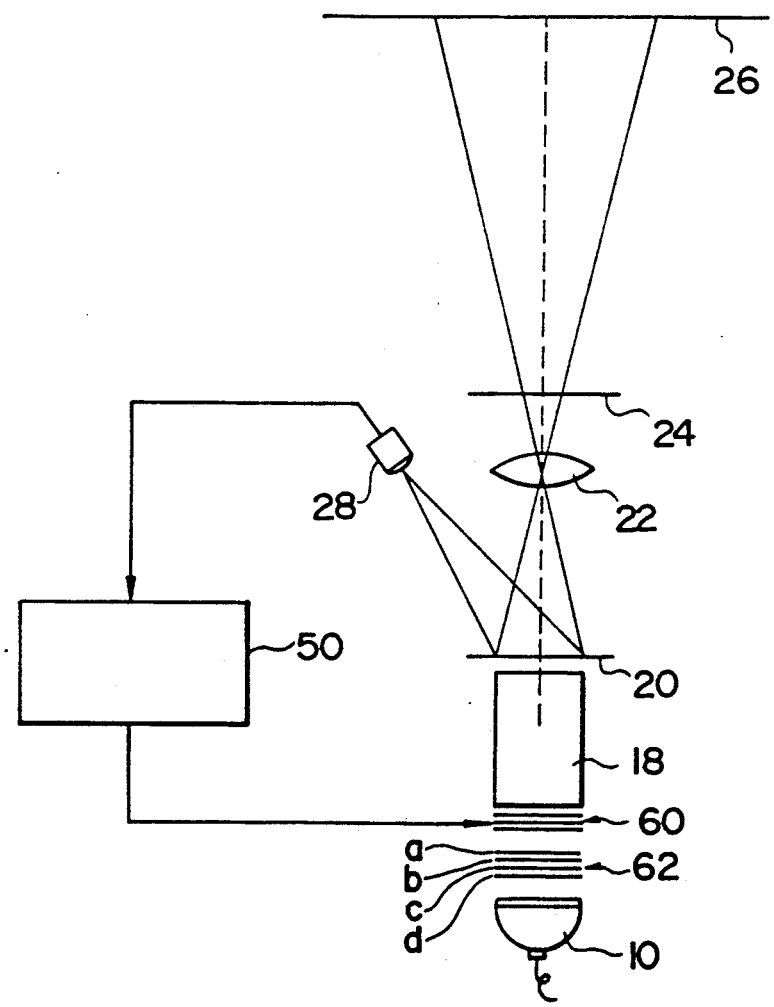
FIG. 12 is a schematic diagram showing an automatic color photographic printer employing a white light subtractive color process, to which the present invention may be applied.
Figure 13:
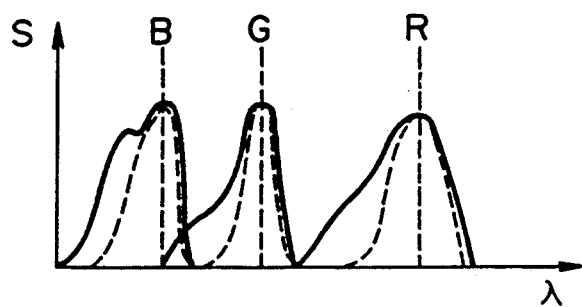
FIGS. 13 (1), (2) and (3) are graphs showing the spectral sensitivity distribution of color paper and a two-dimensional image sensor, and the characteristics of filters in a subtractive color process.
Figure 13:
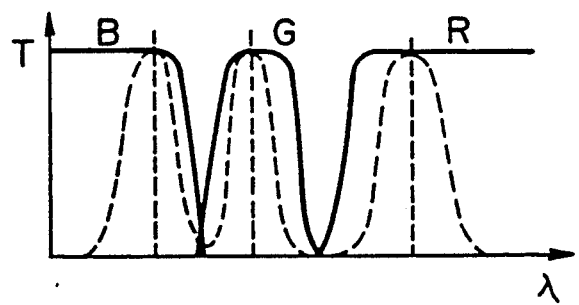
Figure 13:
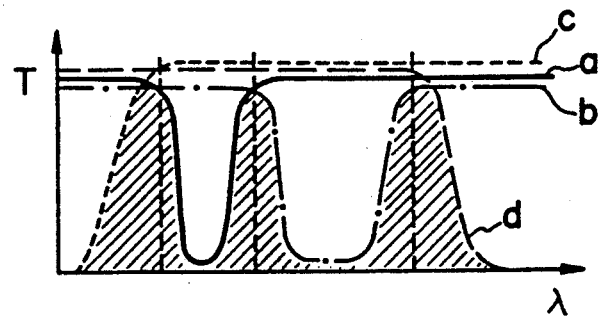

Next, descriptions will be given concerning an automatic color photographic printer employing a white light subtractive color process, to which the present invention may be applied. In FIG. 12, the same reference numerals as those in FIG. 1 are used to denote parts corresponding to those shown in FIG. 1, and the description of those parts will be omitted. The printer includes an exposure determining section 50 which is the same as the corresponding part shown in FIG. 1. In the automatic color photographic printer employing a white light subtractive color process, light adjusting filters 60 and color-light regulating filters 62 are disposed in this order between the lamp house 10 and the mirror box 18. As is already known, the light adjusting filter 60 comprise three filters, namely a yellow (Y) filter, a magenta (M) filter, and a cyan (C) filter. When these filters 60 are controlled by the exposure determining section 50, the exposure amounts are controlled. The color-light regulating filters 62 comprise four filters, namely, a BG regulating filter 62a for regulating B long-wavelength light and G short-wavelength light, a GR regulating filter 62b for regulating G long-wavelength light and R short-wavelength light, an ultraviolet cutting filter 62c, and an infrared cutting filter 62d. With these color-light regulating filters 62, the combination of the ultraviolet cutting filter 62c and the BG regulating filter 62a forms B light, the combination of the BG regulating filter 62a and the GR regulating filter 62b forms G light, and the combination of the infrared cutting filter 62d and the RG regulating filter 62b forms R light. The transmittance characteristics of the color-light regulating filters 62 are shown in FIG. 13 (3).

The two-dimensional image sensor 28 has the following filters. Namely, the sensor 28 has a B filter having a transmittance long-wavelength edge in the absorption band of the BG regulating filter 62a, a G filter having a transmittance short-wavelength edge in the absorption band of the BG regulating filter 62a and also having a transmittance long-wavelength edge in the absorption band of the GR regulating filter 62b, and a R filter having a transmittance short-wavelength edge in the absorption band of the GR regulation filter 62b. The transmittance characteristics of these R, G and B filters are indicated by solid lines in FIG. 13 (2). The combination of these filters of the sensor 28 with the color-light regulating filters 62 results in the transmittance distribution indicated by broken lines in FIG. 13 (2). The R, G and B filters are used with three colors arranged in a mosaic, striped, or checkered pattern, as disclosed in Japanese Patent Application No. 61-22155 (1986). With correction by the color-light regulation filters 62, the spectral sensitivity of color paper is distributed as indicated by broken lines in FIG. 13 (1), in contrast with the spectral sensitivity of the same distributed as indicated by solid lines in FIG. 13 (1) before the correction. Thus, the spectral sensitivity distribution in color paper substantially accords with that in the photometric system, shown in FIG. 13 (2).

When the two spectral sensitivity distributions have been coincided, light is measured using the color-light regulating filters 62, the printing condition for a reference negative film type is corrected in a manner similar to that described before, and printing is affected using Y, M and C filters. Thus, the apparatus employing a white light subtractive color process is also able to affect correct printing even with respect to various film types having different characteristics. The printer employing a white light subtractive color process may have its photometric system and its exposure system disposed separately, and the present invention is of course applicable to this case, too.

As has been described above, according to the present invention, since the printing condition for a reference film type is corrected in accordance with the film characteristics, this ensures that films of various different types are subjected to correct printing. With the sole printing condition for the reference film type being set, films of various different types, which may be underexposed or overexposed, can be printed with high quality. Furthermore, since films of various different types are subjected to printing using as the reference the printing condition for a reference film type, even when any variation occurs in the characteristics or performance of, e.g., the negative developing machine, negative films, or the automatic color photographic printer, it suffices if the sole printing condition for the reference film type is controlled, thereby facilitating management. Furthermore, since automatic correction is affected to achieve conditions which are appropriate to each of different film types, it is possible to produce correct prints from various types of films. The manner in which light is measured and the exposure is controlled may be varied in the carrying out of the present invention, and the present invention is not limited thereto.

The above-described color correction values Aj may be determined as functions of Dj, or a value of an Aj-to-image density table. Further, the density values which may be used in the determination of Aj are not limited to RO, RN, GO, etc. Instead, Aj may be determined from functions of XO, XN and XU (X=R, G or B; "O", "N" and "U" representing the over density, the normal density, and under density, respectively) from a multiplicity of image data, or from suitable constants. Also, instead of determining Aj, the product of Aj×slope control value or Aj·Pj×slope control value may be determined.

The image density which may be used as the image density obtained from the photometric values is not limited to the average image density. Instead, average densities such as the average density of high-density image portions, the average density of intermediate-density image portions, and the average density of low-density image portion may be selectively used. In the above-described embodiments, the deviation of colors is expressed using dW, however, instead of dW, dG or the like, or a ratio between colors may be used with respect to Aj, another correction factor may be added to prepare a matrix. The functional formula which may be used to determine the exposure is not limited to that described in the embodiments. Pj may be determined from a formula different from those described above. For instance, (GO−GN), GO, etc. may be used instead of dWO; or a different density value may be used instead of GN, etc.

The description above gives an example in which correction is affected with respect to three colors R, G and B. Alternatively, correction may be affected in a different manner. That is, difference in color balance is detected, and correction is affected using Aj only with respect to a color having a difference greater than a predetermined value.

The description above gives an example in which one set of printing exposure conditions for a reference film type is stored to determine the exposure. Alternatively, a plurality of printing exposure conditions may be stored in accordance with film types so that they may be used as reference printing exposure conditions to determine the exposure.

Still alternatively, the exposure may be determined on the basis of a reference printing exposure condition, the image density values with respect to three colors, and a correction value calculated on the basis of the characteristic of the reference film type and the characteristic of the film type to which a film or films to be subjected to printing belong. That is, on the basis of the difference between, or ratio of, the image densities, or the difference between, or ratio of, gradients calculated from the image densities.

What is claimed is:

1. An apparatus for determining a photographic printing exposure comprising:
    a light measuring means for measuring light with respect to each of a plurality of film image portions into which images on films to be subjected to printing are divided, and for outputting photometric values obtained by the measurement of light;
    a reading means for reading codes which are recorded on said films and which are indicative of film types of said films;

a classifying means for classifying, on the basis of the read codes, said films into a plurality of film types to which said films belong;

a storing means for storing image densities calculated on the basis of said photometric values, each of said image densities corresponding to each of the film types;

a density-value for calculating a reference value on the basis of an image density corresponding to one of the film types to which one of said films that is to be subjected to printing belongs, for determining a specific color region on the basis of said reference value, and for calculating, on the basis of photometric values belonging to said specific color region, image density values for three colors; and an exposure determining means for determining the exposure of said film to be subjected to printing on the basis of said image density values for three colors and a reference printing exposure condition already stored.

2. An apparatus for determining a photographic printing exposure according to claim 1, wherein the exposure of said film to be subjected to printing is determined on the basis of said reference printing exposure condition already stored, said image density values for three colors, and a correction value obtained by comparing the image density of a reference film type corresponding to said reference printing exposure condition with an average of the image densities of a plurality of images on films belonging to the film type to which said film to be subjected to printing belongs.

3. An apparatus for determining a photographic printing exposure according to claim 1, further comprising a setting means for setting in said storing means a storage area in which, when a new code has been read from a film and said film on which said new code is recorded is found to be a new film type, the image density of said new film type is stored.

4. An apparatus for determining a photographic printing exposure according to claim 2, further comprising a setting means for setting in said storing means a storage area in which, when a new code has been read from a film and said film on which said new code is recorded is found to be a new film type, the image density of said new film type is stored.

5. An apparatus for determining a photographic printing exposure according to claim 1, wherein said reading means reads bar codes which are recorded on edge portions of said films to be subjected to printing and which are indicative of the film kinds of said films.

6. An apparatus for determining a photographic printing exposure according to claim 1, wherein said reference value is any one of an average of a plurality of image densities, a value obtained from a neutral color value and said average, and a value obtained from a flesh color value and said average.

7. An apparatus for determining a photographic printing exposure according to claim 1, wherein said specific color region is a low-saturation color region including neutral colors.

8. An apparatus for determining a photographic printing exposure according to claim 1, wherein said specific color region is a closed region on a color coordinate system which includes at least one of a neutral color and a flesh color.

9. An apparatus for processing data on film types which is for use in a photographic printer comprising:

a light measuring means for measuring light with respect to the primary colors and with respect to film images on a plurality of films to be subjected to printing, and for outputting a plurality of sets of photometric values;

a reading means for reading codes which are recorded on said films and which are indicative of film types of said films;

a classifying means for classifying, on the basis of the read codes, said films into a plurality of film types to which said films belong;

a storing means having a plurality of different storage areas each corresponding to one of the film types and capable of storing therein a plurality of items of data on the image density, each corresponding to one of the film types, and each concerning either, the image densities with respect to the primary colors which are calculated on the basis of each of said plurality of sets of photometric values, or image-density combination values which are each obtained by combining said primary color image densities;

a determining means for affecting comparison between said plurality of items of data each stored in a corresponding storage area of said storing means and each concerning one of said primary color image densities and said image-density combination values, and for determining whether or not a compared plurality of items of data are identical or similar; and a control means for controlling said classifying means in such a manner that certain film types corresponding to the plurality of items of data that concern either one of the primary color image densities and the image-density combination values and that have been determined to be identical or similar by said determining means, are classified into a same film type by said classifying means, and for canceling one of the compared plurality of items of data on the image density which is stored in the corresponding storage area.

10. A film type data processing apparatus for use in a photographic printer according to claim 9, further comprising a setting means for setting in said storing means a storage area in which, when a new code has been read from a film and said film on which said new code is recorded is found to be a new film type, an image density of said new film type is stored.

11. A film type data processing apparatus for use in a photographic printer according to claim 9, wherein said reading means reads bar codes which are recorded on edge portions of said films to be subjected to printing and which are indicative of the film types of said films.

12. An apparatus for determining a photographic printing exposure comprising:

a light measuring means for measuring light with respect to the primary colors and with respect to each of a plurality of film image portions into which images on a plurality of films to be subjected to printing are divided, and for outputting a plurality of sets of photometric values;

a reading means for reading codes which are recorded on said films and which are indicative of film types of said films;

a classifying means for classifying, on the basis of the read codes, said films into a plurality of film types to which said films belong;

a storing means having a plurality of different storage areas each corresponding to one of the film types and capable of storing therein a plurality of items of data on the image density, each corresponding to one of the film types, and each concerning either, the image densities with respect to the primary colors which are calculated on the basis of each of said plurality of sets of photometric values, or image-density combination values which are each obtained by combining said primary color image densities;

a determining means for affecting comparison between said plurality of items of data each stored in a corresponding storage area of said storing means and each concerning one of said primary color image densities and said image-density combination values, and for determining whether or not a compared plurality of items of data are identical or similar;

a control means for controlling said classifying means in such a manner that certain film types corresponding to the plurality of items of data that concern either one of the primary color image densities and the image-density combination values and that have been determined to be identical or similar by said determining means, are classified into a same film type by said classifying means, and for canceling one of the compared plurality of items of data on the image density which is stored in the corresponding storage area;

a density-value calculating means for calculating a reference value on the basis of an image density corresponding to one of the film types to which one of said films that is to be subjected to printing belongs, for determining a specific color region on the basis of said reference value, and for calculating, on the basis of photometric values belonging to said specific color region, image density values for three colors; and an exposure determining means for determining the exposure of said film to be subjected to printing on the basis of said image density values for three colors and a reference printing exposure condition already stored.

13. An apparatus for determining a photographic printing exposure according to claim 12, wherein the exposure of said film to be subjected to printing is determined on the basis of said reference printing exposure condition already stored, said image density values for three colors, and a correction value obtained by comparing the image density of a reference film type corresponding to said reference printing exposure condition with an average of the image densities of a plurality of images on films belonging to the film type to which said film to be subjected to printing belongs.

14. An apparatus for determining a photographic printing exposure according to claim 12, further comprising a setting means for setting in said storing means a storage area in which, when a new code has been read from a film and said film on which said new code is recorded is found to be a new film type, the image density of said new film type is stored.

15. An apparatus for determining a photographic printing exposure according to claim 13, further comprising a setting means for setting in said storing means a storage area in which, when a new code has been read from a film and said film on which said new code is recorded is found to be a new film type, the image density of said new film type is stored.

16. An apparatus for determining a photographic printing exposure according to claim 12, wherein said reading means reads bar codes which are recorded on edge portions of said films to be subjected to printing and which are indicative of the film types of said films.

17. An apparatus for determining a photographic printing exposure according to claim 12, wherein said reference value is any one of an average of a plurality of image densities, a value obtained from a neutral color value and said average, and a value obtained from a flesh color value and said average.

18. An apparatus for determining a photographic printing exposure according to claim 12, wherein said specific color region is a low-saturation color region including neutral colors.

19. An apparatus for determining a photographic printing exposure according to claim 12, wherein said specific color region is a closed region on a color coordinate system which includes at least one of a neutral color and a flesh color.

* * * * *